United States Patent Office 3,632,859
Patented Jan. 4, 1972

3,632,859
DIIODOMETHYL SULFONES
Aldo Joseph Crovetti, Lake Forest, Ill., assignor to Abbott Laboratories, Chicago, Ill.
No Drawing. Filed Mar. 10, 1969, Ser. No. 805,846
Int. Cl. C07c *147/02, 147/06;* A01n *9/14*
U.S. Cl. 260—607 A      11 Claims

ABSTRACT OF THE DISCLOSURE

Diiodomethyl sulfones of the formula:

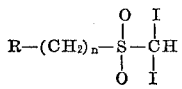

wherein $n$ is an integer from zero to four and R is selected from the group consisting of alkyl, cycloalkyl, t-butylphenyl, loweralkoxyphenyl, naphthyl, nitrophenyl, halonitrophenyl, nitroloweralkylphenyl, polyloweralkylphenyl, haloloweralkylphenyl, or halophenyl. The compounds are useful as fungicides.

---

This invention relates to novel substituted halomethyl sulfones and particularly to compounds wherein the substituents are higher alkyl, aryl and substituted aryl groups. The compounds are useful as fungicides.

Fungi are plants comprising molds, mildews, rusts, smuts and mushrooms and range in size from microscopic cells such as yeasts to highly organized fruiting bodies. While some fungi such as mushrooms are useful, many of them produce undesirable decay and destruction of paper, wood, textiles, grains and the like. Because fungi are found in association with such a large variety of host materials which differ sharply in their resistance to fungicides, there is a continuing need for diverse types of agents for fungus control.

It is an object of this invention therefore to provide compounds which are highly effective in the control of fungus, particularly cellulose consuming mildew. It is a further object of this invention to provide, as fungicides, higher alkyl halomethyl sulfones, aryl and substituted aryl halomethyl sulfones.

These and other objects which will be apparent from the following description are attained through the provision of a compound of the formula

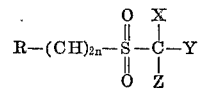

wherein R is selected from the group consising of higher alkyl, cycloalkyl, t-butylphenyl, anilino, anilamido, loweralkoxyphenyl, naphthyl, nitrophenyl, halonitrophenyl, nitroloweralkylphenyl, polyloweralkylphenyl, haloloweralkylphenyl, and halophenyl wherein the halogen is selected from the group consisting of fluorine, bromine and iodine, and $n$ is an integer from 0 to 4, when X, Y and Z have a total molecular weight greater than 110 and are selected from the group consisting of hydrogen and halogen; and wherein R is selected from the group consisting of chlorophenyl and polychlorophenyl when X, Y and Z have a total molecular weight greater than 250 and are selected from the group consisting of hydrogen and halogen.

The term "loweralkyl" as used in the present specification and claims designates a straight chain or branched chain alkyl group containing 1 to 4 carbon atoms; the term "higher alkyl" designates an alkyl group of 10 to 20 carbon atoms.

The compounds of the present invention are prepared by halogenating the R-sulfonyl acetic acids or their esters. Two schemes for preparation of the acids are presented below the illustrate reaction sequences and intermediate compounds where R=methoxyphenyl. Sulfonyl acetic acids with other R substituents may be prepared similarly.

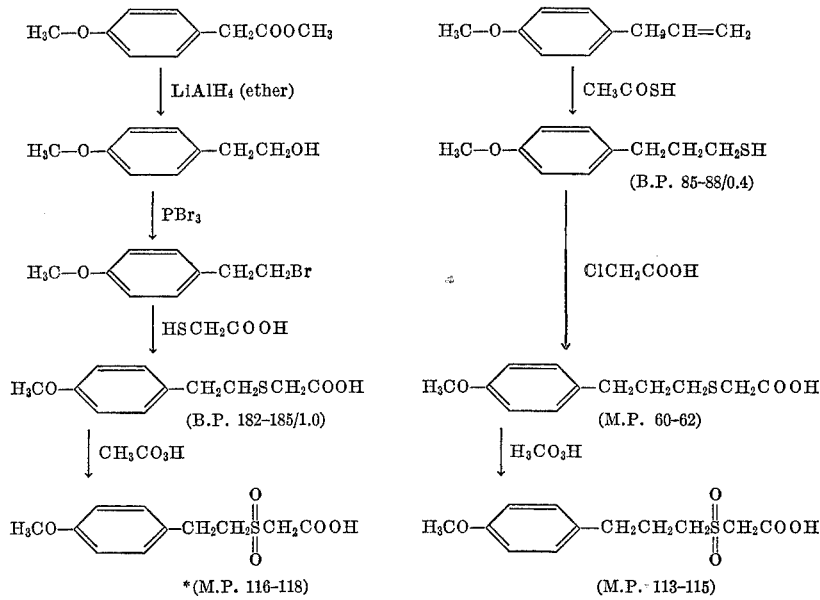

*Melting Points in degrees C.

The R-sulfonyl acetic acids or their esters are halogenated with sodium hypohalite in an alkaline aqueous solution followed by recarboxylation. The reaction may be represented as follows:

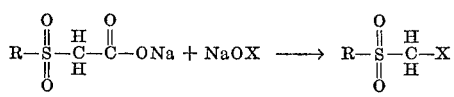

wherein X represents the halogen. The di- and trihalomethyl compounds may be similarly prepared by employing larger proportions of the halogenating reagent. In an alternative procedure, the aryl thioacetic acids may be halogenated with sodium hypohalite according to the following scheme in which oxidation of the sulfur to a sulfonyl group occurs in addition to the halogenation and decarboxylation indicated above:

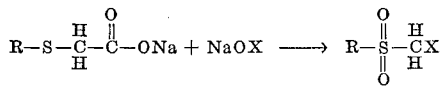

Many of these compounds are active against mildew, *Chaetomium globosum* at concentration of 10 p.p.m., the lowest concentration at which they were tested; others were less active and up to 1000 p.p.m. were required. Larger concentrations may of course be used if the economics of the application permit.

The activity of the compounds against fungus appears to be directly related to the total molecular weight of the halogen atoms on the methyl sulfone group. Thus, the greatest activity is exhibited by the iodomethyl sulfones and they are a preferred embodiment of this invention.

Fungicidal activity also appears to be enhanced when the value of the integer $n$ was larger than 0 and in a preferred embodiment $n$ is equal from 1 to 3.

The following examples will illustrate the preparation of the compounds of this invention but should not be regarded as limiting.

EXAMPLE I p-Bromophenyl-dibromomethyl sulfone p-Bromophenyl dibromomethyl sulfone was prepared by dissolving 19.5 (0.07 mole) of p-bromophenylsulfonyl acetic acid in 320 ml. of 5% aqueous sodium hydroxide solution which was chilled to less than 10° as 21.3 g. (0.133 mole) bromine was slowly added. When addition was complete, the mixture was stirred in the cold another two hours and at room temperature overnight. The solid was filtered and air-dried to yield 26.7 g. of p-bromophenyl-dibromomethyl sulfone melting at 118–121° C. It could be crystallized from dilute ethanol.

Calculated for $C_7H_5Br_3O_2$ (percent): C, 21.40; H, 1.28; Br, 61.02. Found (percent): C, 21.64; H, 1.23; Br, 60.94.

EXAMPLE II p-Bromophenyl-tribromomethyl sulfone p-Bromophenyl-tribromomethyl sulfone was prepared according to the precedure of Example I, but a proportionately larger quantity of bromine was used. The presence of the dibromomethyl and tribromomethyl moiety of the compound of Examples I and II was confirmed with NMR spectra.

EXAMPLE III p-Methoxyphenyl diiodomethyl sulfone p-Methoxyphenyl diiodomethyl sulfone was prepared by dissolving 11.5 g. (0.05 mole) of p-methoxyphenylsulfonyl acetic acid in 40 ml. of 5% aqueous sodium hydroxide (0.05 mole). A solution of sodium hypoiodite was prepared by adding iodine monochloride, 19.5 g. (0.12 mole) to 200 ml. 5% sodium hydroxide solution. The hypoiodite was added to the stirred sulfonyl acetic acid solution at room temperature and after the addition was completed, this mixture was stirred for 2 hours. It was then acidified with 22 ml. concentrated HCl solution and stirred another two hours at room temperature while carbon dioxide evolved. The mixture was made alkaline with 50% sodium hydroxide solution and stirred for 15 minutes. The tan product was filtered off, washed with water, triturated with sodium bisulfite solution to remove color, filtered and washed again. The crude dried p-methoxyphenyl diiodomethyl sulfone weighed 18.5 g. and was crystallized from acetone-water, melting point 132-4°.

Calclulated for $C_8H_8I_2O_3S$ (percent): C, 21.93; H, 1.84; I, 57,95. Found (percent): C, 21.85; H, 2.11; I, 57.97.

Other compounds of this invention prepared according to like procedures are:

| | M.P., °C. |
|---|---|
| 4-(methyl amido)-phenyl-diiodomethyl sulfone | 214–216 |
| 4-aminophenyl diiodomethyl sulfone | 180–182 |
| 4-chlorophenyl diiodomethyl sulfone | 132–134 |
| 4-bromophenyl diiodomethyl sulfone | 132–133 |
| 2-methyl-4-chlorophenyl diiodomethyl sulfone | 110–111 |
| Alphanaphthyl diiodomethyl sulfone | 138–141 |
| 2-methyl-4-bromophenyl diiodomethyl sulfone | 114–115 |
| 3-methyl-4-bromophenyl diiodomethyl sulfone | 136–139 |
| 2,4-dimethylphenyl diiodomethyl sulfone | 114–117 |
| 3,4-dichlorophenyl diiodomethyl sulfone | 144–146 |
| 4-chlorophenyl dibromomethyl sulfone | 112–116 |
| 4-methoxyphenyl dibromomethyl sulfone | 80–83 |
| 4-chlorophenyl tribromomethyl sulfone | 160–162 |
| 4-methoxyphenyl tribromomethyl sulfone | 134–137 |
| 2-methyl-4-t-butylphenyl diiodomethyl sulfone | 127–128 |
| 2-nitro-4-methylphenyl dibromomethyl sulfone | 153–154 |
| 2-nitro-4-methylphenyl tribromomethyl sulfone | 183–186 |
| 2-nitro-4-methylphenyl iodomethyl sulfone | 132–140 |
| 4-chlorobenzyl diiodomethyl sulfone | 138–141 |
| 2-nitro-4-chlorophenyl iodomethyl sulfone | 183–184 |
| 2-nitro-4-chlorophenyl tribromomethyl sulfone | 185 |
| 4-nitrophenyl diiodomethyl sulfone | 184–186 |
| 2-methyl-4-t-butylphenyl tribromomethyl sulfone | 137–138 |
| 2-nitro-4-chlorophenyl diiodomethyl sulfone | 160–162 |
| 4-nitrophenyl tribromomethyl sulfone | 197–199 |
| 4-chlorobenzyl iodomethyl sulfone | 219–220 |
| Cyclohexyl diiodomethyl sulfone | 126–128 |
| n-Octyl diiodomethyl sulfone | 72–74 |
| 4-fluorobenzyl diiodomethyl sulfone | 119–121 |
| 4-bromobenzyl diiodomethyl sulfone | 149–151 |
| 4-methoxybenzyl diiodomethyl sulfone | 168–170 |
| 3-chlorobenzyl diiodomethyl sulfone | 182–184 |
| 3,5-dimethyl diiodomethyl sulfone | 188–190 |
| 1-phenyl-2-(diiodomethylsulfonyl)ethane | 69–71 |
| 3-bromobenzyl diiodomethyl sulfone | 192–194 |
| 2-naphthylmethyl-diiodomethyl sulfone | 172–174 |
| 1-phenyl-3-(diiodomethylsulfonyl)propane | 68–70 |
| 3,4-dimethylbenzyl diiodomethyl sulfone | 175–184 |
| 2,2,4,4-tetramethylbutyl diiodomethyl sulfone | 101–103 |
| 4-fluoro-benzyl dibromomethyl sulfone | 115–117 |
| 3-chlorobenzyl dibromomethyl sulfone | 150–152 |
| 4-bromobenzyl dibromomethyl sulfone | 126–128 |
| 3,4-dichlorobenzyl dibromomethyl sulfone | 130–132 |
| 2,4-dichlorobenzyl dibromomethyl sulfone | 109–111 |
| 3-bromobenzyl dibromomethyl sulfone | 151–153 |
| 2-bromobenzyl dibromomethyl sulfone | 110–112 |
| 4-nitrobenzyl dibromomethyl sulfone | 151–153 |
| 4-methoxybenzyl dibromomethyl sulfone | 125–127 |
| 2-5-dimethylbenzyl dibromomethyl sulfone | 119–121 |
| 3,4-dimethylbenzyl dibromomethyl sulfone | 118–125 |
| 1-phenyl-2-(dibromomethylsulfonyl)ethane | (¹) |
| 1-phenyl-3-(dibromomethylsulfonyl)propane | 55–57 |
| Cyclohexyldibromomethyl sulfone | 96–98 |
| n-Decyldibromomethyl sulfone | 47–49 |
| n-Hexadecyl dibromomethyl sulfone | 76–78 |
| n-Decyl diiodomethyl sulfone | 71–79 |
| 2-chlorobenzyl dibromomethyl sulfone | 107–108 |

¹ Oil.

The following example will illustrate the antifungal properties of representative examples of the compounds of this invention. The characters R, $n$, and X, Y, and Z correspond to those shown in Formula I.

EXAMPLE IV

In this example, a nutrient medium containing a predetermined concentration of the test compound was inoculated with the fungus, incubated and then read to determine the extent of growth of the fungus. The nutrient medium employed was Saboraud's liquid medium with 1.5% agar added and was autoclaved for 15 minutes at 15 pounds pressure.

The inoculum, in this instance *Chaetomium globosum* ATCC 6025, slant grown at 280 C. for seven days on a starvation medium (4% dextrose, 1% yeast extract, and 1.5 grams agar per liter of water) was scraped and suspended in approximately 2 ml. Saboraud's broth. The spore suspension was adjusted to equal the No. 1 McFarland's Standard Nephalometer tube using Saboraud's broth as a diluent.

The fungicidal compound was prepared by weighing 50 mg. of material into a 0.25 ml. of dimethylformamide and then diluted to 10 ml. with water. An amount of fungicide solution sufficient to provide 1000 p.p.m. and 10 p.p.m., respectively, was added to sterile petri dishes and 10 ml. of nutrient medium agar was added to each and mixed thoroughly. The inoculum was applied with a cotton swab and, after three days incubation at 28°, the plates were ready for growth or absence of growth of the fungus. The results are reported in Table I.

TABLE I

| Compound number | R | n | XYZ | Concentration to inhibit C. globosum |
|---|---|---|---|---|
| 1 | Br—⌬— | 0 | HBrBr | 1,000 |
| 2 | H₃CO—⌬— | 0 | HII | 10 |
| 3 | C₁₀H₂₁ | 0 | HII | 1,000 |
| 4 | ⟨S⟩ | 0 | HBrBr | 1,000 |
| 5 | ⟨S⟩ | 0 | HII | 10 |
| 6 | Br—⌬ | 0 | HII | 10 |
| 7 | F—⌬ | 1 | HII | 10 |
| 8 | H₂N—⌬ | 0 | HII | 10 |
| 9 | H₃C—C(O)—N(H)—⌬ | 0 | HII | 100 |
| 10 | H₃CO—⌬ | 0 | BrBrBr | 100 |
| 11 | (naphthyl) | 0 | HII | 10 |
| 12 | O₂N—⌬ | 0 | BrBrBr | 10 |
| 13 | Cl—⌬—NO₂ | 0 | HHI | 100 |
| 14 | CH₃—⌬—NO₂ | 0 | BrBrBr | 10 |
| 15 | Br—⌬—CH₃ | 0 | HHI | 1,000 |
| 16 | (H₃C)₃C—⌬—CH₃ | 0 | HII | 10 |
| 17 | H₃C—⌬—CH₃ | 1 | HII | 10 |
| 18 | Cl—⌬— | 0 | HII | 10 |
| 19 | Cl—⌬(Cl) | 0 | HII | 10 |
| 20 | (H₃C)₃C—⌬ | 0 | HII | 10 |

All of the compounds listed in Table I inhibit the growth of C. globosum at 1000 p.p.m. and that many of the compounds of this invention completely inhibit fungus growth at a concentration as low as 10 p.p.m., the lowest concentration tested.

Without additional examples, it is believed that one skilled in the art, from the foregoing description is enabled to use this invention to its fullest extent.

I claim:
1. A compound of the formula

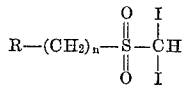

wherein R is selected from the group consisting of alkyl, cycloalkyl, halophenyl wherein the halogen is fluoro, bromo or iodo, t-butylphenyl, loweralkoxyphenyl, naphthyl, nitrophenyl, halonitrophenyl, nitroloweralkylphenyl, haloloweralkylphenyl, or polyloweralkylphenyl, and $n$ is an integer from zero to four.

2. A compound according to claim 1 wherein X, Y and Z are respectively hydrogen, iodine and iodine, $n=3$ and R is phenyl.

3. A compound according to claim 1 wherein R is 4-methoxyphenyl.

4. A compound according to claim 1 wherein R is 2-methyl-4-chlorophenyl.

5. A compound according to claim 1 wherein R is 2-methyl-4-t-butylphenyl.

6. A compound according to claim 1 wherein R is 4-methoxy phenyl.

7. A compound according to claim 1 wherein R is 3,4-dimethyl phenyl.

8. A compound according to claim 1 wherein R is 4-halophenyl.

9. A compound according to claim 8 wherein the halo substituent is chlorine.

10. A compound according to claim 8 wherein the halo substituent is bromine.

11. A compound according to claim 8 wherein R is 3,4-dichlorophenyl.

References Cited

UNITED STATES PATENTS 2,484,489  1949  Craig et al. _____ 260—607 A

FOREIGN PATENTS 540,258  1957  Canada _____ 260—607
1,256,216  1967  Germany _____ 260—607
1,473,116  1967  France _____ 260—607

OTHER REFERENCES

Herschler et al., "Chem Abstracts," vol. 63 (1965) p. 11363d.

Konishiroku "Chem Abstracts," vol. 67 (1967) pp. 5600–01 #596095.

Exner "Chem Abstracts," vol. 54 (1960), pp. 5519g–5520a.

Paquette et al., "J.A.C.S." vol. 90 (1968), pp. 6790–94.

Paquette et al., "J. Org. Chem.," vol. 33 (1968), pp. 1080–83.

CHARLES B. PARKER, Primary Examiner

D. R. PHILLIPS, Assistant Examiner

U.S. Cl. X.R.

260—516, 518 R, 521 R, 526 S, 535 R, 557 R, 578, 609 D, 612 D, 613 D, 617 R, 618 R, 632 R, 651 R, 652 R; 424—320, 330, 337